United States Patent [19]

Dunham et al.

[11] 3,718,339
[45] *Feb. 27, 1973

[54] WORKPIECE STOP ASSEMBLY FOR CONTRACTING COLLET CHUCKS

[75] Inventors: Russell H. Dunham; Harry A. Moody; Don H. Skahen, all of New Fairfield, Conn.

[73] Assignee: The Dunham Tool Company, Inc., New Fairfield, Conn.

[ * ] Notice: The portion of the term of this patent subsequent to Aug. 29, 1989, has been disclaimed.

[22] Filed: Oct. 16, 1970

[21] Appl. No.: 81,397

[52] U.S. Cl. ................................. 279/51, 279/1 S
[51] Int. Cl. ........................................... B23b 31/20
[58] Field of Search ...................... 279/1 S, 1 E, 51

[56] References Cited

UNITED STATES PATENTS 3,510,141   5/1970   Dunham ............................. 279/51
3,041,078   6/1962   Lawall et al. ....................... 279/1 S Primary Examiner—Francis S. Husar
Attorney—Mandeville and Schweitzer

[57] ABSTRACT

The application discloses a workpiece stop assembly for use in connection with contracting collet chucks. The stop assembly is received internally of the chuck and has a fixed position with respect to the spindle of the lathe or screw machine with which the chuck is associated. When a workpiece is received in the chuck, its inner end is seated against the workpiece stop before the collet chuck is actuated. The collet chuck is closed upon the workpiece by reason of an axial withdrawing movement of the chuck. Normally this can result in an undesirable axial shifting of the workpiece. However, the workpiece is prevented from axial displacement by reason of the workpiece stop, which remains fixed in its position while the chuck moves axially to grip the work. The workpiece stop assembly of the present invention is especially adapted for use in association with collet chucks intended for the gripping of workpieces of smaller diameter.

12 Claims, 2 Drawing Figures

INVENTORS
RUSSELL H. DUNHAM
HARRY A. MOODY
DON H. SKAHEN

BY Mandeville & Schweitzer

ATTORNEYS

WORKPIECE STOP ASSEMBLY FOR CONTRACTING COLLET CHUCKS

RELATED PATENTS AND APPLICATIONS

The present invention is related to and constitutes an improvement in relation to the R.H. Dunham, U.S. Pat. No. 3,510.141, granted May 5, 1970. The subject matter of the present application also is related to the co-pending application of D.H. Skahen, Ser. No. 81,483, filed Oct. 16, 1970, for "Spring Actuated Release Of Contracting Collet Chucks for Lathes and the Like".

BACKGROUND AND SUMMARY OF THE INVENTION

A widely used and conventional facility for the gripping of workpieces in lathes, screw machines and the like is the contracting collet chuck. The collet chuck is of generally cylindrical configuration and is provided at its outer end with a plurality of radial slots dividing its generally cylindrical wall into a plurality of contractible gripping elements. The outer portions of the gripping elements are provided with outwardly flaring surfaces for cooperation with a frusto-conical surface in the interior of the spindle of the lathe. The inner end of the collet is threadily engaged with a draw tube actuator, by which the collet can be drawn into the spindle.

When gripping a workpiece with a conventional contracting collet chuck, the chuck is initially selected or machined to have an opening closely corresponding to but slightly larger than the diameter of the workpiece. When the gripping fingers of the collet are relaxed, the workpiece may be readily inserted in the chuck opening. Thereafter, the chuck is drawn into the spindle of the lathe by action of the draw tube, causing the chucking fingers to be contracted against the walls of the workpiece.

As it will be appreciated, since the radial closing or clamping actions of the collet chuck are realized by an axial retracting movement of the chuck, the chucking operation may involve slight axial movements of the workpiece itself. This presents certain problems when the workpiece must be machined to close tolerances in its axial dimensions. In this respect, the extent of axial movement of the workpiece brought about by the closing action of the collet chuck cannot reliably be predicted, as it will vary as a magnified function of variations in initial workpiece diameter.

By the invention of the Dunham U.S. Pat. No. 3,510,141, a novel arrangement has been provided for accurately fixing the axial position of a workpiece gripped by a contracting collet chuck. The patented arrangement involves a workpiece stop assembly which is inserted through the forward opening of the collet chuck and is seated against the outer face of the lathe spindle. When the workpiece is inserted in the collet chuck, it is seated firmly against the stop member. Thereafter, when the collet chuck is drawn axially to grip the workpiece, the workpiece is prevented from moving axially along with the chuck by reason of the presence of the stop assembly.

In the stop assembly of the beforementioned Dunham patent, the ability of the device to be inserted and withdrawn through the forward opening of the collet chuck, while providing many important advantages, imposes a practical limitation on the use of the assembly in connection with workpieces of smaller diameters. Thus, the construction of the patented workpiece stop assembly is such that the workpiece-engaging portion thereof is received through the slots and workpiece opening of the collet chuck. As the workpiece opening becomes smaller, for the reception of workpieces of smaller diameter, the interior configuration of the workpiece stop itself must become correspondingly smaller. And, since substantial forces are imposed upon the internal elements of the workpiece stop assembly, the strength requirements of the unit begin to conflict with its ability to be inserted through the front opening of the collet chuck, as chuck openings become progressively smaller.

In accordance with the present invention, a novel and improved workpiece stop assembly is provided for reception in a contracting collet workpiece chuck, which is particularly adapted for association with chucks intended to handle workpieces of very small diameter. To this end, the workpiece stop assembly of the invention incorporates a novel construction, including a plurality of connecting elements received in the slot portions of the collet chuck, entirely independently of the diameter of the workpiece opening. These connecting elements are engaged, behind the collet chuck, by a pedestal element, of larger size than the workpiece opening, which provides for the adjustable support of the workpiece. Since a conventional collet chuck has or can be readily made to have an enlarged internal opening behind the gripping region, the back portion of the collet chuck can readily accommodate the presence of the pedestal, even though its dimensions are grossly in excess of those of the workpiece opening.

A particular advantage of the construction of the present invention resides in the fact that it is compatible with lathe or screw machine spindles of conventional construction. Further, the work piece stop assembly is of a simplified, yet rugged construction, which can be incorporated with a collet chuck at reasonable cost and which will readily withstand the service conditions to which it normally is exposed.

PRIOR ART

Typically prior art arrangements for providing workpiece stops in association with collet chucks are reflected in the C. Haley et al, U.S. Pat. No. 2,502,719 and the C.R. Hughes U.S. Pat. No. 3,385,607, considered as one group, and the H. Bailey U.S. Pat. No. 2,398,278, the L.R. Evans U.S. Pat. No. 2,469,160, and the A. Lawall et al. U.S. Pat. No. 3,040,078, considered as a group. The prior art patents of the first group disclose workpiece stop devices which are received internally of and secured in relation to the collets themselves. The stop devices of this group function appropriately to limit the extent of insertion of the workpiece into the collet itself, but necessarily travel along with the collet when it is actuated in an axial direction, and thus do not prevent shifting of the workpiece relative to the lathe spindle. The patents of the second group, while providing a fixed reference position for the workpiece relative to the lathe spindle, all have other serious shortcomings which render their use relatively unattractive. The Bailey patent, for example, provides a facility for grouping the internal walls of the lathe spindle, but such a device could not be utilized in a lathe of conventional construction, in which a chuck-actuating draw tube passes through the hollow spindle to the back of the lathe. The device of the Evans patent incorporates a plurality of locking wedges, which extend through special, enlarged openings in the side wall of the collet and may be actuated into frictional engagements with the internal walls of the spindle. This is a complex and expensive construction, and its utility is somewhat compromised by the fact that it relies upon friction alone to retain the workpiece properly positioned relative to the lathe spindle. The Lawall et al patent illustrates a device which requires a special sleeve for the collet and/or a special spindle for the lathe, such that the device is not readily utilizable with conventional equipment.

For a better understanding of the various features of the present invention, and of its advantages over the prior art, reference should be made to the following description details and to the accompanying drawing.

DESCRIPTION OF A PREFERRED EMBODIMENT OF THE INVENTION

Figure 1:
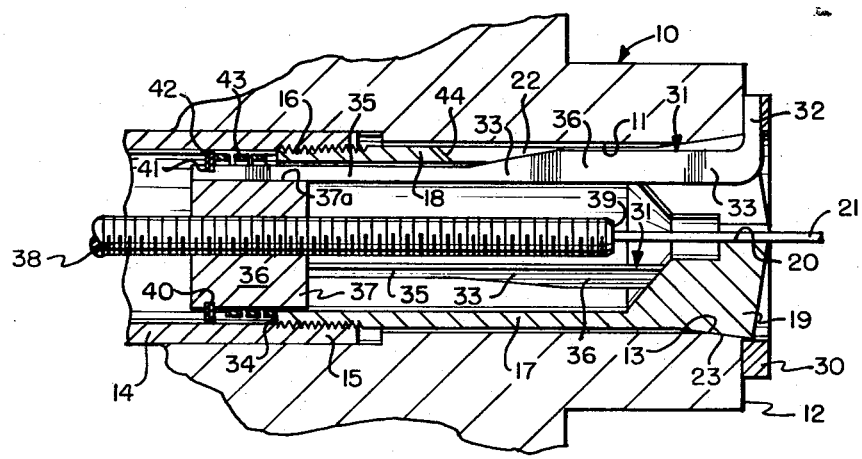
FIG. 1 is a fragmentary longitudinal cross sectional view of a conventional lathe or similar machine tool utilizing a contracting collet, and incorporating a workpiece stop assembly according to the invention.
Figure 2:
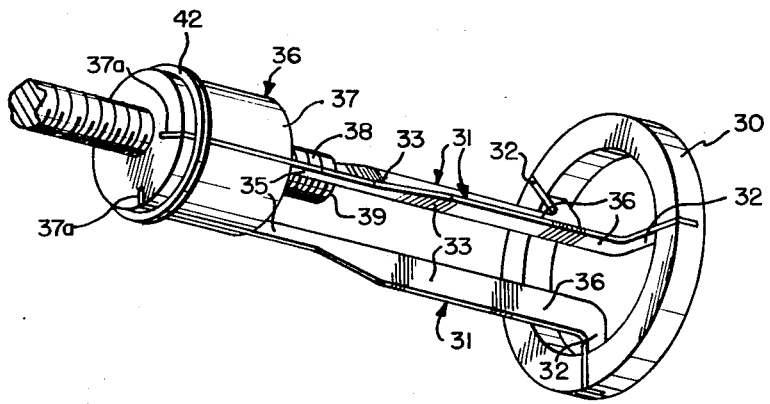
FIG. 2 is a prospective view of the new workpiece stop assembly.

Referring now to the drawing, the reference numeral 10 designates generally the spindle of a lathe or similar turning machine of conventional construction. The spindle 10 is conventionally provided with an outer end cylindrical bore 11 which, adjacent the outer face 12 of the spindle, merges with an outwardly flaring conical bore 13. Internally, the spindle 10 slideably receives an elongated draw tube 14 the back-end (not shown) of which projects to the back of the lathe and is accessible for longitudinal manipulation relative to the lathe spindle 10. Conventionally, the draw tube 10 is internally threaded at its forward end extremity 15 and is arranged to engage with the threaded inner end 16 of a contracting collet 17.

In accordance with the invention, both the collet 17 and the spindle 10 may be wholly conventional construction and configuration.

A shown in the drawing, the collet 17 may include a cylindrical wall 18, provided at its inner end with the draw tube engaging threads 16, and extending forward to an integral workpiece gripping portion 19. The gripping portion 19 includes an opening 20 of approximately the size and shape of a predetermined workpiece 21, ideally being a few thousands of an inch larger in diameter than the workpiece to accommodate its easy axial insertion into the opening. Conventionally, the collet is provided with a plurality of angularly spaced radial slots 22, which extend from the forward end extremity of the collet rearward to a point somewhat in front of the threaded end section 16. Most commonly, three radial slots, spaced apart approximately 120 degrees, are provided in the collet wall. The arrangement is such that the forward portion of the collet, including the gripping portion 19, is divided into three cantilever-supported sections, which may be yieldably pressed inward against the workpiece. The collet further is provided adjacent its forward end extremity with an outwardly flaring frusto-conical surface portion 23 arranged for cooperation with the bore 13 in the spindle. Thus, when the collet 17, is drawn rearwardly (to the left in FIG. 1) in the spindle, by actuation of the threadedly engaged draw bar 14, the several sections of the collet are forced radially inward by the inclined surfaces 13,23, closing the gripping portion 19 of the collet tightly on the workpiece 21.

In accordance with the invention, a novel workpiece stop assembly is provided for use in conjunction with the collet 17, such that, when a workpiece 21 is inserted therein and the collet is drawn axially into the spindle to effect the desired gripping action, the workpiece 21 is reliably held in a fixed position relative to the front surface 12 of the spindle. The workpiece stop of the invention includes a reference element 30, advantageously in the form of an annular ring, which is arranged to be seated against the front face 12 of the spindle. Rigidly secured to the reference ring 30 are a plurality (desirably equal in number to the slots 22 of the collet) of L-shaped web-like connecting elements 31. The connecting elements are formed of a thin, flat, high-strength sheet material, and outwardly extending arms 32 of the elements are welded or otherwise rigidly secured to the reference ring 30. The connecting elements 31 include longitudinally extending fins 33, which are received in the slots 22 of the collet. In this respect, the connecting elements 31 are of a thickness somewhat less than that of the radial slots 22, to accommodate easy reception of the elements in the slots and also to permit at least a slight reduction in the width of the slots during contracting movements of the collet.

As shown particularly in FIG. 1, the axially extending fins 33 of the connecting elements are of a length entirely through the collet 17 and to project somewhat from the rearward end surface 34 thereof. The connecting elements 31 thus include rearward portions 35 of relatively narrow radial dimensions which connect forward portions 36 of somewhat larger radial dimensions. Desirably, the internal clearance dimension provided by the internal surfaces of the several connecting elements 31 is as large as is consistent with the strength requirements of the unit, so that the stop assembly may be used with collet sizes ranging from the smallest sizes up to the maximum size which will clear the interior of the connecting elements 31. The limiting condition, generally, is the diameter of the collet in the region in which the rearward portions 35 of the connecting elements 31 pass through the unslotted rear portion of the collet.

At the back of the collet and workpiece stop assembly, there is provided a pedestal assembly 36 comprising a slotted pedestal block and adjustable work stop 38. The work stop 38 typically is in the form of a bolt or threaded rod having a stop surface 39 at its forward end against which the workpiece 21 is arranged to be seated. The work stop is threadily engaged with the pedestal block 37 and is adjustably positioned relative thereto by rotational manipulation. The pedestal block is provided with radial slots 37a for closely receiving the rearwardly extending portions 35 of the connecting elements 31, and the pedestal block is suitably secured to the connecting elements in the completed assembly. Advantageously, an annular groove 40 is provided in the pedestal block which is aligned with complimentary transverse grooves 41 in the connecting elements. The aligned grooves are adapted for the reception of a split ring retaining element 42 of a conventional type.

When the work stop assembly is in use, it is of course necessary that the locating ring 30 be retained tightly against the front surface of the spindle 10 while the workpiece 21 is being seated against the stop surface 39. A variety of means may be suitable for this purpose. A particularly advantageous such means, however, is illustrated in the drawings and, in addition, forms the subject matter of the related application Ser. No. 81,483 of D.H. Skahen. The improved retaining means comprises a spring element 43, which is ideally in the form of a short compression spring, formed of wire of rectangular cross section. The rectangular cross sectional configuration of the spring wire is elongated in the axial direction, enabling the spring wire to be physically accommodated in the narrow annular space between the outer surface of the pedestal block 37 and the interior surface of the draw tube 14. In practice, this space is usually less than the minimum wall thickness of the collet chuck itself and thus may be on the order of only 3/32nds of an inch, for example. The split ring element 42, which may be of a commercially available design, forms a complete annular shoulder projecting radially outward from the pedestal block 37 and serves as an abutment surface against which the back face of the spring 43 acts. The front face of the spring is arranged to act forwardly against the back surface 34 of the collet chuck.

In the complete assembly of the collet chuck and workpiece stop, the entire workpiece stop assembly thus is urged in a rearward direction relative to the collet chuck. And, in accordance with the invention, the design parameters of the spring 43 and the space within which it acts, defined by the retaining ring 42 and the collect back surface 34 are such that, in all operative positions of the collet chuck, when it is threadedly attached to the draw tube 14, the locating ring 30 is yieldably urged against the front face of the lathe spindle.

As will be observed in FIG. 1, the internal diameter of the locating ring 30 is such that the ring may pass freely over the outer extremity of the collet chuck 17. The work shop assembly thus may be slid toward the rear of the collet until the wide portions 36 of the connecting elements 31 are engaged by the back edges 44 of the collet slots 22. With the parts thus disposed, the spring 43 may be applied over the pedestal block 37 and secured by the retaining ring 42 without any compressive force on the spring. When the assembly is later installed in the lathe, and the collet chuck is threadedly engaged by the draw tube, the collet chuck is drawn sufficiently into the lathe spindle, even in the forward positions of the draw tube, to cause the locating ring 30 to engage the front surface 12 of the spindle and to cause compressive force to be exerted on the spring 43. This arrangement, among other things, reliably retains the positioning ring 30 in its fixed reference position under all operating circumstances. Thereafter, adjustment of the work stop is effected solely by manipulations of the threaded stop element 38.

One of the important advantages of the workpiece stop assembly of the invention resides in the fact that the mechanism of the assembly occupies a practical minimum of space within the collet chuck. As a result, the assembly is capable of use with collet chucks covering a wide variety of sizes. Further, in this respect, the pedestal block from which the stop element extends is mounted at the rear extremity of the collet chuck, enabling workpieces to extend far into the collet if desired.

The structure of the invention takes recognition of the fact that, with decreasing sizes of collet chuck front openings, it becomes progressively less practical to provide for the insertion of the completed work stop assembly through the front face of the collet. Accordingly, the assembly of the invention includes a front portion, comprising a locating ring and axially extending thin web-like connecting elements, which is assembled from the front of the collet, and a back portion, comprising a pedestal block, adjustable stop element and retaining ring, which are assembled from the back of the collet.

The design and configuration of the web-like connecting elements 31 of the new device is such as to optimize the strength of the assembly in relation to the size of the workpiece with which it may be utilized. To this end, the outer portions of the connecting elements, which are received in the radial slots of the collet chuck, extend from an internal reference circle (corresponding to the maximum workpiece size to be accommodated) to an outer reference circle approximately equal to the internal diameter of the lathe spindle. In the rear portions of the assembly, the rearward extensions 35 of the connecting elements extend radially from the inner reference circle to an intermediate reference circle approximately equal in diameter to the internal diameter of the collet chuck.

The invention incorporates a particularly advantageous arrangement for maintaining the reference position of the locating ring 30, in the form of a cylindrical compression spring 43, which is received in the narrow annular space between the pedestal block and the draw tube 14. The relation-ship of these parts is such that, whenever the draw tube is engaged with the collet chuck, the rear surface 34 of the collet chuck is so positioned as to cause compression to be imparted to the spring 43, urging the locating ring against the spindle. A corollary result of this arrangement, which is described and claimed in the co-pending application of Don Shaken, is that, when the draw tube 14 is actuated in a rearward direction, to grip the workpiece 21, the spring 43 is even further compressed. The spring 43 thus acts, through the fixed reference provided by the workpiece stop assembly, to forcibly urge the collet chuck 17 in its outward or opening direction. This is extremely advantageous in assisting in the opening of the collet chuck in lathe installations which do not have special, double-acting opening and closing actuators.

The workpiece stop assembly of the invention is ideally associated with the type of stop assembly of the type described and claimed in the Dunham U.S. Pat. No. 3,510,141. The respective devices may be selectively utilized with different collet chucks, according to the size of the work opening chucks, which is particularly advantageous in connection with the positioning of workpieces of larger diameters.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A workpiece stop assembly for a slotted collet chuck, comprising
   a. a locating member adapted to be seated against the front face of a lathe spindle in generally surrounding relation to the forward end of a collet chuck received in the spindle,
   b. a plurality of thin web-like elements secured to said locating member and extending rearwardly through said chuck,
   c. forward portions of said web-like elements being received in radial slots in said collet chuck, and rearward portions of said elements extending along the internal wall of the rear portion of the collet chuck,
   d. a generally cylindrical stop pedestal of larger diameter than the collet chuck workpiece opening engaging said web-like elements adjacent the rear portion of the collet chuck,
   e. said stop pedestal being received in the rear portion of the collet chuck and extending rearward therefrom,
   f. means on said pedestal forming a forwardly facing shoulder behind the rearward extremity of the collet chuck, and
   g. resilient means under axial compression acting between said shoulder and said rearward extremity to urge said locating member against said spindle.

2. The workpiece stop assembly of claim 1, further characterized by
   a. said web-like elements having a minimum internal dimension greater than the internal diameter of the collet chuck workpiece opening and extending throughout substantially the entire length of the collet chuck,
   b. the external dimensions of the web-like elements passing through the unslotted rear portions of the collet chuck being substantially as large as the internal dimensions of said unslotted portions.

3. A workpiece stop assembly for a slotted collet chuck, comprising
   a. a locating member adapted to be seated against the front face of a lathe spindle
   b. a plurality of connecting elements extending from the locating member through the spindle to the rear of the collet chuck,
   c. a pedestal block located at the back of the collet chuck and attached to the connecting elements, and
   d. an adjustable stop member extending forward from said pedestal block into the interior of the collet chuck,
   e. said pedestal block being of a cross sectional configuration incapable of passing through the workpiece opening of the collet chuck,
   f. said connecting elements being releasably secured to at least one of said locating member and said pedestal block, and
   g. means for constantly urging the workpiece stop assembly in a rearward direction relative to the collet chuck.

4. The workpiece stop assembly of claim 3, further characterized by
   a. said connecting elements extending throughout the entire length of the collet chuck,
   b. said pedestal block comprising a cylindrical element slideably received in the rear portions of the collet chuck, and
   c. means comprising a removable locking ring for detachably engaging said pedestal block to said connecting elements.

5. The workpiece stop assembly of claim 4, further characterized by
   a. said collet chuck being connected at its back end to a draw tube,
   b. said locking ring being received in an annular groove in the pedestal block and extending radially outward toward the interior wall of the draw tube, and
   c. compression spring means being provided between said locking ring and a rearwardly facing shoulder of said collet chuck for urging an locating member toward said spindle.

6. The workpiece stop assembly of claim 5, further characterized by
   a. said spring means being formed of wire of rectangular cross section,
   b. the principal axis of said rectangular cross section extending generally parallel to the axis of the collet chuck.

7. In combination with
   i. a rotary lathe spindle having a front face and a central bore, and said bore having a forwardly divergent region adjacent its forward end,
   ii. a slotted tubular collet chuck slidably received is said spindle and having a forwardly divergent region adjacent its forward end for cooperation with the divergent region of said spindle bore,
   iii. said collet chuck having a plurality of radial slots extending from its forward extremity to a region forward of its rear extremity, and
   iv. a tubular draw bar slidably received in said spindle bore and threadedly engaged with the unslotted rear extremity of the collet chuck,
   v. said collet chuck having a workpiece receiving opening in its front face arranged to be opened and closed by forward and rearward movements of said draw bar, an improved workpiece stop assembly, comprising
   a. a workpiece stop element located at the back of the collet chuck,
   b. a locating element positioned in contact with an axially fixed reference surface of said spindle, adjacent the forward end of the collet chuck,
   c. longitudinally disposed connecting elements extending from said locating element to said stop element,
   d. said connecting elements passing inwardly through the slots of the collet chuck and then extending axially through the interior of the unslotted portion of the collet chuck, and c. means releasably securing said connecting elements to said workpiece stop element behind the rearward end extremity of the collet chuck and preventing passage of said workpiece stop element through the front openings of said collet chuck.

8. The combination of claim 7, further characterized by
 a. said connecting elements being formed of thin sheet-like material oriented radially with respect to the collet,
 b. said workpiece stop element including a generally cylindrical pedestal received internally of the collet chuck and projecting rearward therefrom, and
 c. a threaded stop member received in said pedestal.

9. The combination of claim 8, further characterized by
 a. said pedestal being closely received within the collet chuck and having a plurality of radial slots for the reception of said connecting elements.

10. The combination of claim 9, further characterized by
 a. spring means arranged to act rearwardly upon said pedestal to urge said locating member into its reference position.

11. The combination of claim 7, further characterized by
 a. said locating member being in the form of a ring, and the internal diameter of the ring being greater than the external diameter of the collet chuck, whereby said chuck may be projected forwardly, through the ring, to facilitate securing of said connecting elements to said workpiece stop element.

12. The combination of claim 13, further characterized by
 a. cooperating shoulders being formed on said workpiece stop element and said collet chuck,
 b. a compressible coil spring positioned to act axially in compression between said shoulders
 c. the length of the spring and the spacing of the shoulders being so related as to cause the spring to be compressed when said chuck and stop assembly are in operating positions with respect to said spindle, and to enable the spring to be completely free of compression when the collet is projected through the ring for assembly of the connecting elements to the workpiece stop element.

* * * * *